INVENTORS
DAVID B. JAROFF
DONALD D. LITT
ARNOLD WEINSTEIN
BY
ATTORNEY

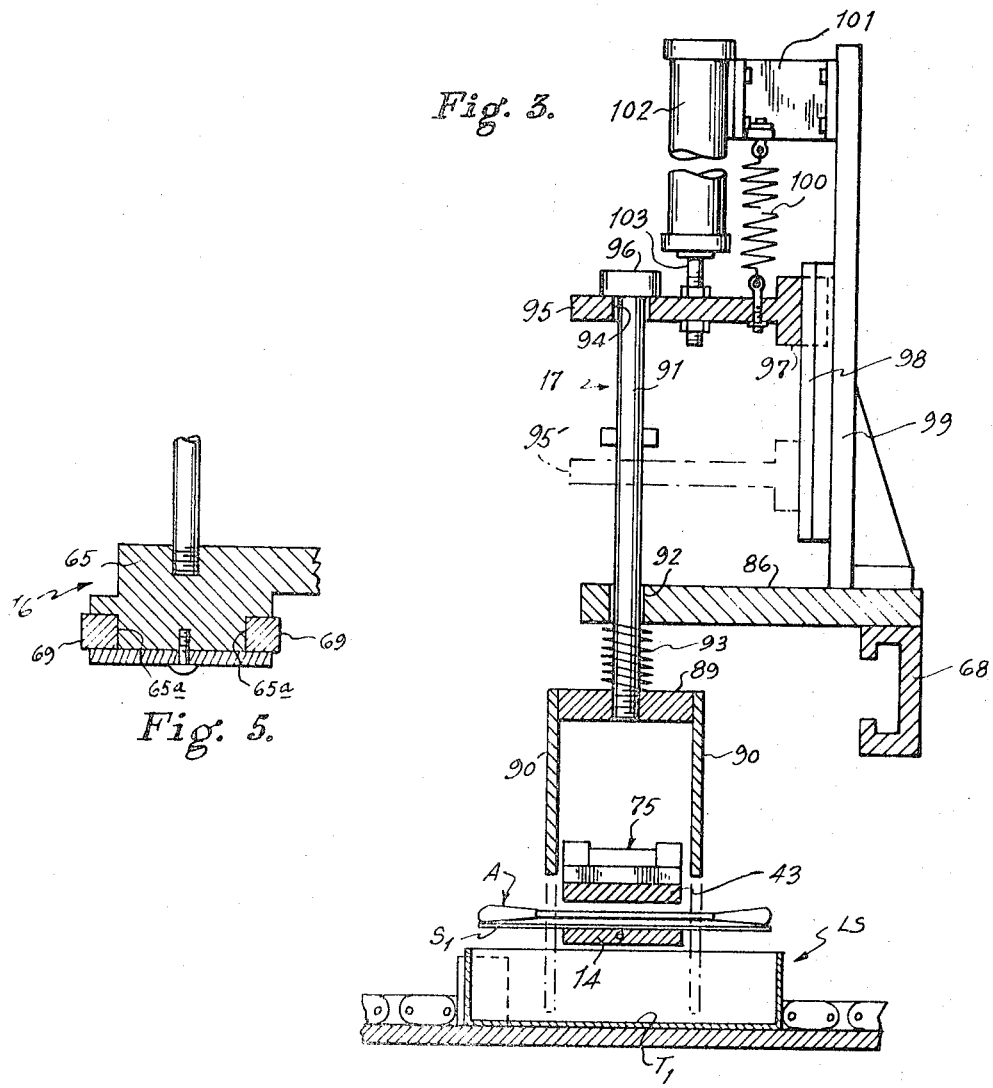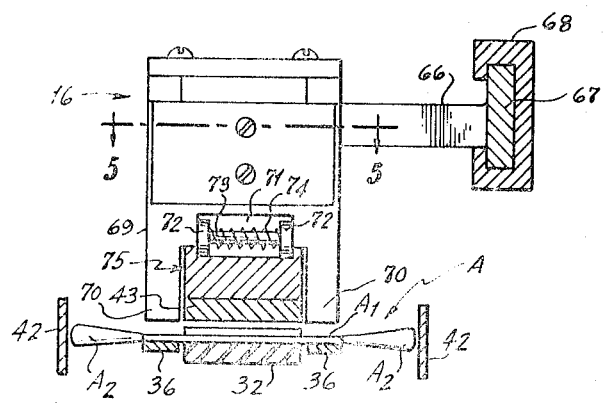

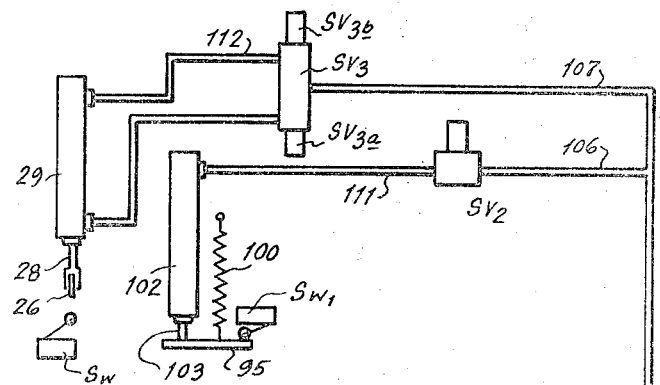
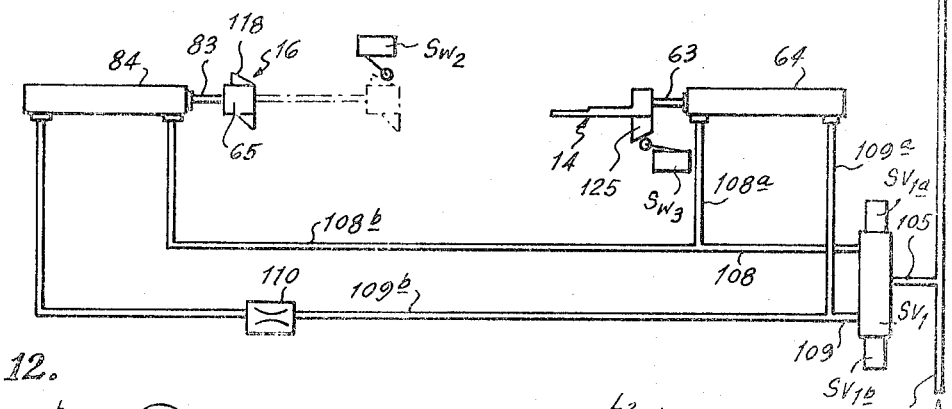
Fig. 11.
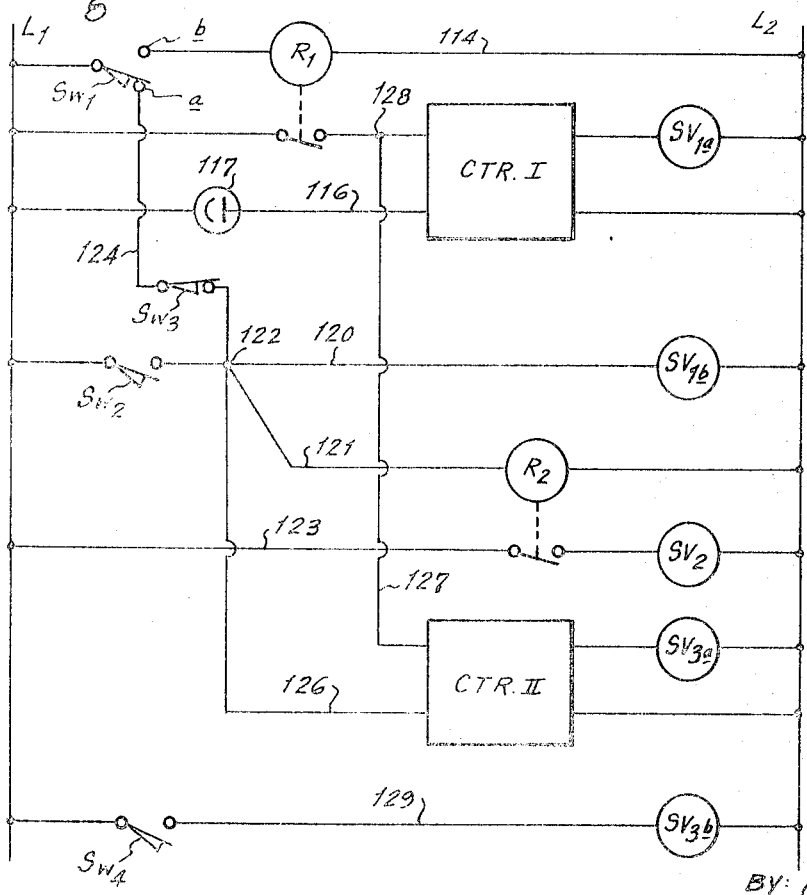
Fig. 12.

United States Patent Office 3,543,476
Patented Dec. 1, 1970

3,543,476
SWAB PACKAGING APPARATUS
David B. Jaroff, New York, Donald D. Litt, Scarsdale, and Arnold Weinstein, New York, N.Y., assignors to Custom Swabs, Inc., Long Island City, N.Y., a corporation of New York
Filed Dec. 24, 1968, Ser. No. 786,642
Int. Cl. B65b *19/34, 34/40, 57/20*
U.S. Cl. 53—62                                13 Claims

ABSTRACT OF THE DISCLOSURE

In apparatus for packaging swabs or other elongated articles in upwardly opening containers or trays which are transported intermittently to and from a loading station, a conveyor carries the successive swabs for accumulation on a platform which extends to one side of a container at such loading station at a level above the container, upon the accumulation of a predetermined number of swabs on the platform, a support member is moved from a retracted position at the other side of the path of the containers to an extended position where such support member abuts the platform and, with the support member in its extended position, a pusher is reciprocated from a rest position along the platform to displace the accumulated swabs onto the extended support member, whereupon the support member is returned to its retracted position while the swabs are urged downwardly to form a layer thereof in the underlying container at the loading station. Where two or more layers of swabs are to be loaded into each container, the support member may carry a separating sheet from a stack thereof during each movement to its extended position for underlying the swabs displaced onto the support member by the pusher, and each container is moved away from the loading station only after the foregoing cycle of operations has been repeated a suitable number of times.

---

This invention relates generally to apparatus for packaging swabs or other elongated articles in upwardly opening, tray-like containers.

Machines have been developed for the extremely rapid, automatic production of medicinal swabs. Such swabs are usually packaged in tray-like containers, each receiving several layers of swabs with separating sheets therebetween and then being slidably telescoped in a sleeve for permitting removal of the swabs therefrom. Heretofore, the described packaging of the swabs in tray-like containers has been effected manually at relatively great cost in labor so that much of the economy that might have been expected to follow from the use of automatic swab producing machines has not been realized.

Accordingly, it is an object of this invention to provide a fully automatic apparatus for packaging swabs or other elongated articles in upwardly opening, tray-like containers.

Another object is to provide packaging apparatus of the described character which can continuously receive the swabs to be packaged at the extremely high rate at which such swabs are now manufactured by modern production machines.

A further object is to provide apparatus of the described character capable of packaging the swabs in several uniform layers within each tray-like container with the layers having separating sheets disposed therebetween.

Still another object is to provide apparatus of the described type which is relatively simple in construction and reliable in operation, and further arranged to prevent damage to its parts in the event of any interruption in its operating cycle.

In accordance with an aspect of this invention, the tray-like containers in which the swabs are to be packaged are intermittently transported in succession to and from a loading station, a conveyor, which is preferably continuously movable, carries the successive swabs for accumulation on a platform which extends to one side of the loading station at a level above the adjacent side of a container there at rest, upon the accumulation of a predetermined number of swabs on the platform, a support member is moved from a retracted position at the other side of the loading station to an extended position where it abuts the platform and, with the support member in such extended position, a pusher is reciprocated from a rest position along the platform to displace the accumulated swabs onto the extended support member, whereupon the support member is returned to its retracted position while the swabs are urged downwardly into the underlying container to form a layer of swabs in the latter.

When a plurality of layers of swabs are to be loaded into each container, as is preferred, the support member carries a separating sheet from a stack thereof during its movement to the extended position for underlying the swabs displaced onto the support member from the accumulating platform, such separating sheet and the swabs thereon are stripped from the support member during the return of the latter to its retracted position, and each container is moved from the loading station only after the foregoing cycle of operations has been repeated a suitable number of times.

The above, and other objects, features and advantages of the invention, will be apparent in the following detailed description of an illustrative embodiment thereof which is to be read in connection with the accompanying drawings, wherein:

FIG. 3 is a sectional view taken along the line 3—3 on FIG. 2;

FIG. 4 is a detail sectional view taken along the line 4—4 on FIG. 2;

FIG. 5 is a detail sectional view taken along the line 5—5 on FIG. 4;

FIG. 11 is a schematic view of a pneumatic system for operating the apparatus; and FIG. 12 is a schematic diagram of electrical control circuits of the apparatus.

Figure 1:
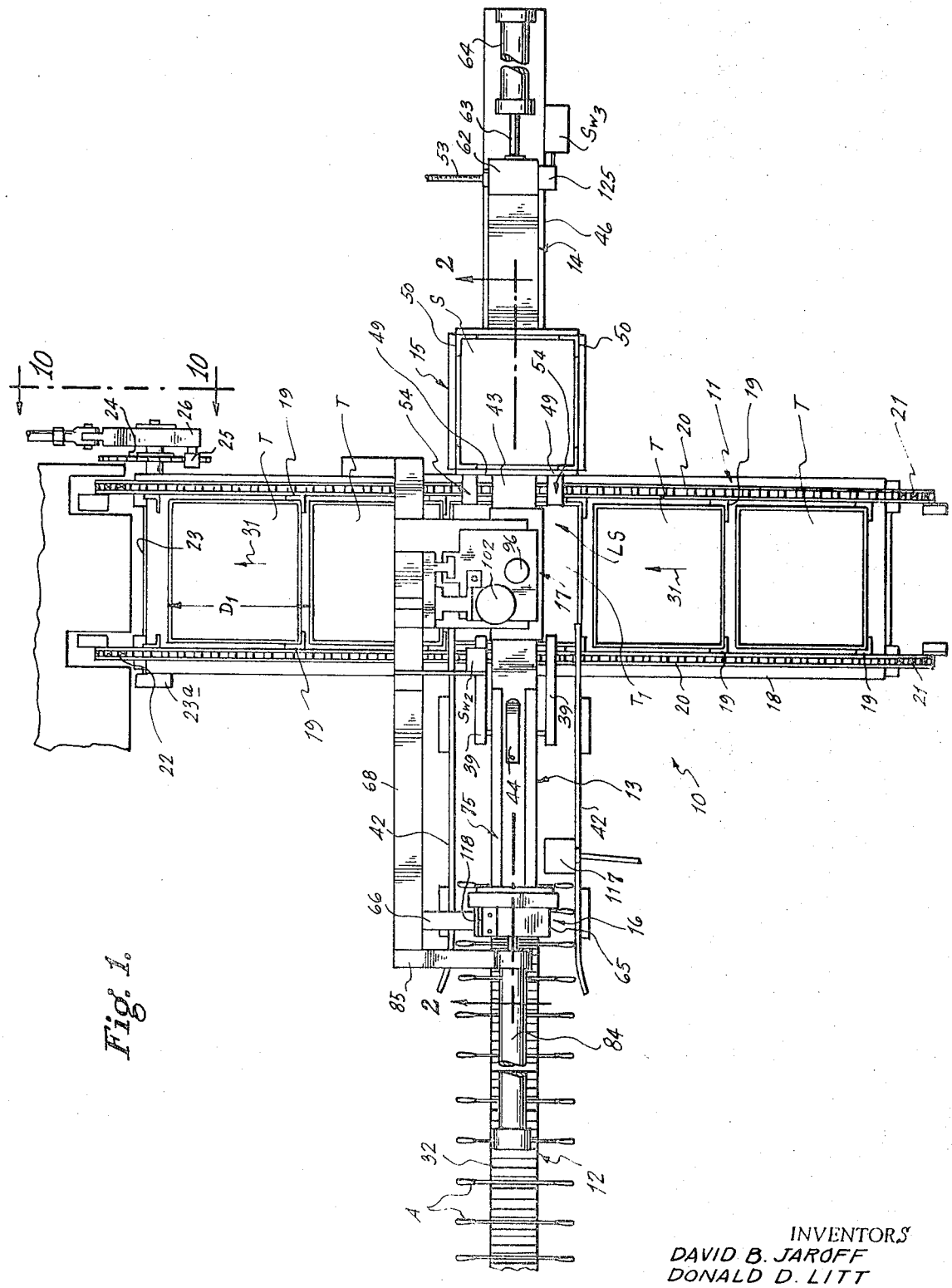
FIG. 1 is a top plan view of a swab packaging apparatus according to an embodiment of this invention.

Referring to the drawings in detail, and initially to FIG. 1 thereof, it will be seen that a swab packaging apparatus 10 according to this invention is there shown to generally comprise:

A first conveyor 11 by which the relatively shallow, upwardly opening containers or trays T are transported in succession to and from a loading station LS where each tray is held at rest during the loading of swabs or other elongated articles therein;

A second conveyor 12 which is preferably continuously movable and carries the successive swabs A, for example, from a swab producing machine or other source thereof (not shown), for accumulation on a platform assembly 13 extending to one side of loading stations LS at a level above the adjacent side of the tray $T_1$ which is there at rest;

A support member 14 movable from a retracted position at the other side of the loading station to an extended position (FIG. 2) where it forms an abutting extension of platform assembly 13;

A magazine 15 for containing a stack of separating sheets S which are removed one at at time from the stack by support member 14 during movement of the latter to its extended position;

A pusher assembly 16 reciprocable along platform assembly 13 from a rest position (FIGS. 1 and 2) to displace the accumulated swabs from the platform assembly onto the support member 14 in its extended position; and A swab depositing assembly 17 disposed above loading station LS and by which the swabs displaced onto support member 14 are urged downwardly into the underlying container $T_1$ to form a uniform layer of swabs in the latter upon the return of support member 14 to its retracted position.

In the embodiment shown, the conveyor 11 for trays T includes a horizontal, elongated table 18 forming a support surface along which the successive trays are intermittently propelled by pushers 19 at spaced apart locations along conveyor chains 20 guided around sprockets 21 and 22 rotatably supported adjacent the opposite ends of table 18 so that the upper runs of chains 20 extend along such table. In order to effect the intermittent advancement of chains 20, and hence of trays T engaged by pushers 19, the shaft 23 on which sprockets 22 are secured has a ratchet wheel 24 also fixed thereon and engageable by a pawl 25 carried by one end of an arm 26 which is freely turnable on shaft 23. The end of arm 26 remote from pawl 25 is pivotally connected, as at 27, to a piston rod 28 extending from a compressed air or other fluid-pressure operated cylinder 29 which is pivotally supported at its other end, as at 30. Thus, when compressed air is supplied to cylinder 29 in the direction to extend its piston rod 28, arm 26 is rocked in the direction to engage pawl 25 with the teeth of ratchet wheel 24 so as to correspondingly turn the latter and sprockets 22 for advancing trays T along table 18 in the direction of arrows 31 on FIG. 1. The operative stroke of cylinder 29 is selected so that, during such operative stroke, chains 20 are advanced by the distance $D_1$ between the leading edges of adjacent trays on conveyor 11. Further, the rotational position of ratchet wheel 24 on shaft 23 is selected so that, at the conclusion of each working stroke of cylinder 29, a tray T on conveyor 11 is accurately located at loading station LS. A friction brake 23a may be provided on shaft 23 to prevent coasting rotation of the latter upon the completion of the working stroke of cylinder 29. When compressed air is supplied to cylinder 29 in the direction to effect the return stroke of its piston rod 28, pawl 25 skips over the teeth of ratchet wheel 24 and thus does not displace conveyor chains 20.

The conveyor 12, which preferably extends at right angles to conveyor 11, is conveniently constituted by an endless flexible belt 32 running around guide rollers 33 (FIG. 2) and having spaced, laterally directed ribs 34 projecting from its outer surface to define grooves therebetween in which the swabs A are accommodated. One or more of the guide rollers 33 are continuously rotated by a suitable drive (not shown) so that the upper runs of belt 32 moves continuously in the direction of arrow 35 on FIG. 2, that is, in the direction toward platform assembly 13. Each swab A, as is known, may include an elongated roller paper or wooden stick $A_1$ and a wound cotton tip $A_2$ on one or each of the ends of stick $A_1$ (FIG. 4). Preferably, the width of conveyor belt 32 is selected so that each swab is engaged by the belt only at its stick $A_1$ and has its cotton tips $A_2$ projecting laterally beyond the belt. As the successive swabs A carried by conveyor 12 arrive at the terminus of the latter defined by the guide roller 33 which supports the end of the upper horizontal run of belt 32 adjacent platform assembly 13, the projecting end portions of each swab are engaged from below by suitably supported horizontal fingers 36 (FIG. 4) so as to be guided from the conveyor terminus onto platform assembly 13.

Platform assembly 13 is shown to have a base 37 (FIG. 2) supporting an elongated platform member 38 which extends from the terminus of swab conveyor 12 to one side of loading station LS and has its upper surface at a level slightly above the adjacent side wall of tray $T_1$ at rest at the loading station. The successive swabs A removed from conveyor 12 at the terminus of the latter are accumulated on platform member 38, as shown on FIG. 2, with the axes of the accumulated swabs extending laterally with respect to the length of the platform member. Platform member 38 has a width substantially smaller than the length of swabs so that the tipped end portions of the accumulated swabs project laterally beyond the side edges of the platform member.

Figure 2:
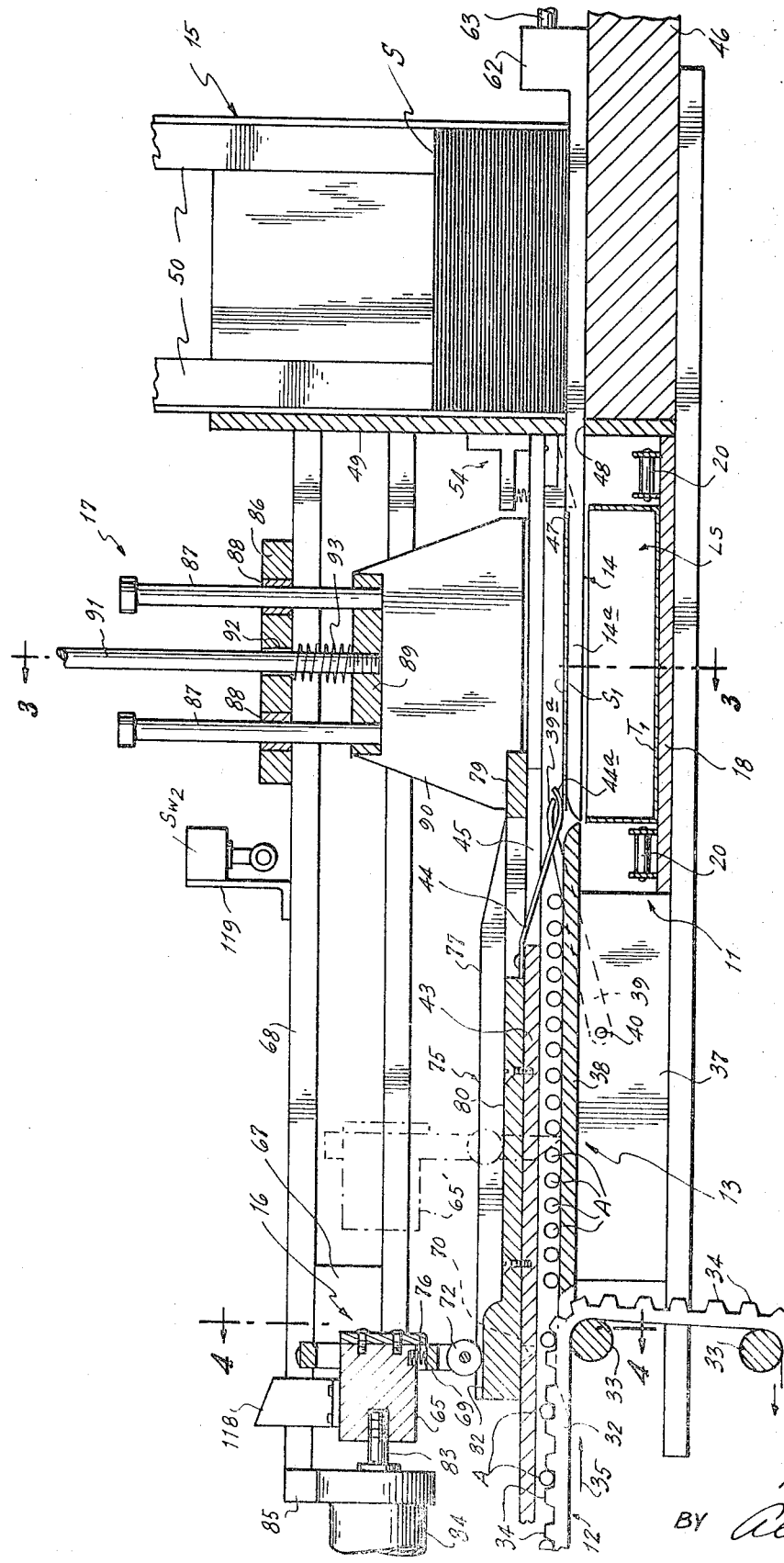
FIG. 2 is an enlarged, fragmentary sectional view taken along the line 2—2 on FIG. 1.

Platform assembly 13 is further shown to include elongated fingers 39 which are pivotally mounted on the ends of a shaft 40 extending laterally through base 37 so as to be swingable in vertical planes at the opposite sides of platform member 38. Fingers 39 extends from shaft 40 in the direction toward conveyor 11 and are longitudinally dimensioned so that their downwardly curved free ends 39a (FIGS. 2 and 7) project beyond the adjacent end of platform member 38. Torsion springs 41 (FIG. 7) are engaged with fingers 39 so as to urge the latter upwardly to normal positions in which the free ends 39a of the fingers are raised above the level of the top surface of platform member 38 (FIG. 2). Of course, the fingers 39 may be fixedly mounted and formed of spring metal so as to be capable of downward flexing from the position shown on FIG. 2, rather than being rigid and pivotally mounted, as shown.

Suitably supported side guide rails 42 (FIGS. 1, 4 and 7) extend from the terminus of swab conveyor 12 along the opposite sides of platform member 38 to engage the ends of the swabs accumulated on the latter and thereby effect lateral alignment of such accumulated swabs. Further, an overhead guide member 43 (FIGS. 1, 2, 3 and 4) is suitably supported at a level above platform member 38 and extends longitudinally along the latter and across loading station LS so as to be engageable from above with the sticks $A_1$ of the swabs for preventing upward displacement of the latter from the surface of the platform member. A leaf spring 44 (FIGS. 1 and 2) is mounted at one end on overhead guide 43 and is inclined downwardly through an elongated slot 45 in the latter so as to yieldably dispose its upwardly curved free end 44a beyond the end of platform member 38 and approximately at the level of the upper surface of the latter (FIG. 2).

It will be apparent from FIG. 2 that, as swabs A are accumulated along platform member 38, the foremost swab on the platform member will be engaged, at its tip portions, by the upwardly inclined fingers 39 whereby the accumulated swabs are held against inadvertent discharge off the end of platform member 38 adjacent loading station LS.

Support member 14 is shown to be of elongated, substantially flat configuration and to be slidably guided on a base 46 for reciprocation at right angles to the direction of movement of conveyor 11 in the same plane as platform member 38. The upper surface of support member 14 is formed, intermediate its ends, with a step 47 (FIG. 7) having a depth substantially equal to the thickness of each of the separating sheets S. During its reciprocation, support member 14 is movable longitudinally through a slot 48 (FIG. 2) formed in a face plate 49 of magazine 15, and such slot 48 has a lateral dimension approximately equal to the corresponding dimension of separating sheets S and a height that closely corresponds to the thickness of support member 14 in back of step 47. Magazine 15 is shown to further include vertically directed angle members 50 (FIGS. 1 and 2) extending upwardly from base 46 to guide the corners of the stack of sheets S so that the lowermost sheet of the stack bears downwardly on the upper surface of support member 14. Thus, when support member 14 is in its retracted position (FIG. 1) in which its portion 14a ahead of step 47 is disposed under the stack of separating sheets S, the lowermost sheet in the stack rests on the upper surface of portion 14a and has its edge remote from face plate 49 engaged by step 47. When support member 14 is moved to its extended position (FIG. 2), as hereinafter described, step 47 causes the lowermost sheet to be propelled from under the stack and to pass through slot 48 with portion 14a of the support member, whereby to be disposed in overlying relationship to the tray $T_1$ at the loading station, as indicated at $S_1$ on FIG. 2.

In order to ensure that the sheet $S_1$ will adhere to portion 14a of the support member and travel with it out from under the stack of separating sheets in magazine 15, the upper surface of portion 14a is preferably provided with openings 51 (FIG. 7) communicating with a bore 52 extending longitudinally within support member 14 and connected at one end to a flexible hose 53 (FIG. 1) extending from member 14 to a vacuum pump (not shown) or other suitable source of suction. Thus, suction acts at openings 51 to hold the separating sheet $S_1$ to the surface of portion 14a.

Figure 8:
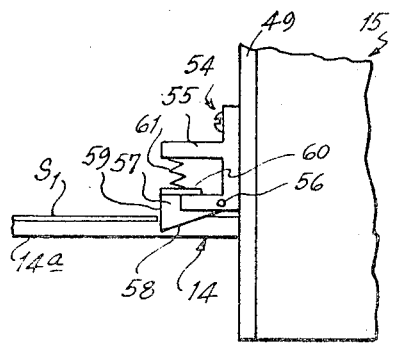
FIGS. 8 and 9 are fragmentary detail views illustrating the operation of stripping elements included in the apparatus.

In order that the separating sheet $S_1$ positioned in overlying relation to the tray $T_1$ at the loading station by the movement of support member 14 to its extended position will be stripped from such support member upon return of the latter to its retracted position and thus will fall into the tray therebelow, stripping devices 54 (FIGS. 1, 2, 8 and 9) are provided on face plate 49 at the opposite sides of the path of travel of support member 14. As shown particularly on FIGS. 8 and 9 each stripping device 54 includes a bracket 55 suitably secured on face plate 49 above the plane of support member 14 and carrying a pin 56 on which a stripping element 57 is pivotally mounted. Stripping element 57 is shown to have an inclined lower surface 58, a generally vertical end face 59 and a laterally directed flange 60 which is engageable with bracket 55 to limit the downward swinging movement of the stripping element (FIG. 8). A spring 61 is interposed between stripping element 57 and bracket 55 to urge the stripping element downwardly to the position of FIG. 8 at which its inclined surface 58 extends across the plane of the top surface of support member 14.

Figure 9:
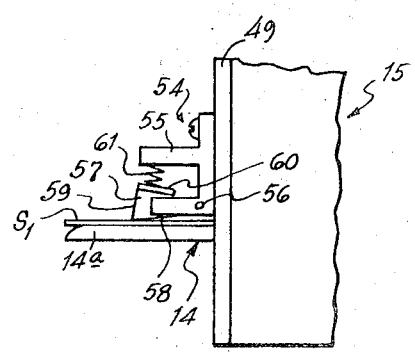

As shown on FIG. 9, during movement of support member 14 to its extended position, the separating sheet $S_1$ being carried by the support member engages the inclined surface 58 of each stripping element 57 to deflect the latter upwardly out of the path of travel of the separating sheet. When support member 14 is in its fully extended position, as shown on FIG. 8, the trailing edge of sheet $S_1$, considered in the direction of movement of support member 14 to its extended posititon, clears each of stripping elements 57 so that the latter are moved downwardly by springs 61 to dispose their vertical faces 59 in back of the adjacent trailing edge of the separating sheet. When support member 14 is thereafter returned to its retracted position, faces 59 of stripping elements 57 block the movement of separating sheet $S_1$ with the support member and thereby strip the separating sheet from the support member.

In order to effect the movements of support member 14 between its retracted and extended positions, the end of the support member which projects from under magazine 15 at the side of the latter remote from conveyor 11, which end may be vertically enlarged, as at 62, is suitably secured to a piston rod 63 extending from a compressed air or other fluid pressure operated cylinder 64 mounted on base 46. Thus, when compressed air is supplied to cylinder 64 in one direction, support member 14 is displaced to its extended position and, when compressed air is supplied to cylinder 64 in the opposite direction, support member 14 is returned to its retracted position.

Referring now to FIGS. 1, 2 and 4, it will be seen that the pusher assembly 16 of the illustrated apparatus 10 comprises a body 65 disposed above the level of conveyor 12 and platform member 38 and being reciprocable along the latter between a rest position (FIGS. 1 and 2) adjacent the terminus of swab conveyor 12 and a displaced position adjacent the end of platform member 38 at a side of conveyor 11. In order to mount body 65 for such reciprocal movement, an arm 66 extends laterally from body 65 and terminates in a slide 67 which is slidable along a suitably mounted support track 68. A generally H-shaped pusher 69 is vertically slidable in guides 65a defined by body 65 (FIG. 5) and has depending fingers 70 (FIG. 4) which are laterally spaced apart so as to be outside the longitudinal edges of platform member 38 and overhead guide 43. Mounted within a recess 71 in pusher 69 are cam follower rollers 72 (FIG. 4) which are freely rotatable on a shaft 73 and urged laterally apart against the side surfaces of recess 71 by a spring 74. Rollers 72 are engageable from above with a cam member 75 which extends along and is secured on top of overhead guide 43. In order to ensure engagement of rollers 72 with cam 75 during movement of body 65 between its rest and displaced positions, a spring 76 (FIG. 2) may be interposed between body 65 and pusher 69 for urging the latter downwardly relative to body 65.

Figure 6:
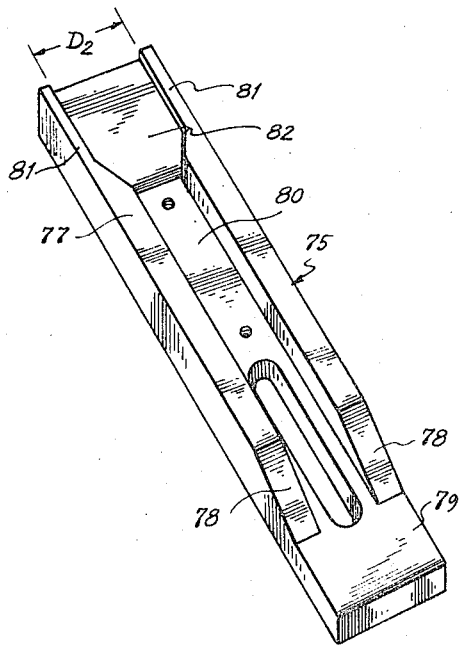
FIG. 6 is a perspective view of a cam member included in the apparatus according to the invention.

Cam member 75 has a width approximately equal to that of guide 43 so that fingers 70 of pusher 69 can depend from the latter past the cam member at the opposite sides of the latter (FIG. 4), and the length of cam member 75 is selected so that it extends longitudinally from above the terminus of swab conveyor 12 to a location above the side of tray $T_1$ which is adjacent the discharge end of platform member 38 (FIG. 2). As shown particularly on FIGS. 2 and 6, cam member 75 has elevated rails 77 extending along its opposite sides from the end of the cam member disposed above the terminus of conveyor 12 and terminating in inclined ranges 78 extending to a relatively depressed surface 79 at the other end portion of the cam. Between rails 77 there is an elongated depressed surface 80 at the level of end surface 79 and extending from the latter longitudinally along cam member 75 to a location above the end of platform member 78 which is adjacent the terminus of conveyor 12 (FIG. 2). The end portions 81 of rails 77 remote from the ramps 78 are cut away at their inside surfaces so as to be of reduced width (FIG. 6) and have an enlarged distance $D_2$ therebetween which is approximately equal to the axial distance between the outer surfaces of cam follower rollers 72 when the latter are in engagement with the side surfaces of recess 71 (FIG. 4). Between the end portions 81 of rails 77 there is an elevated surface 82 at a level higher than that of surface 80 but slightly below the level of the top surfaces of rails 77.

When body 65 of pusher assembly 16 is in its rest position (FIG. 2) rollers 72 engage upon surface 82 so as to lift pusher 69 to a position where its depending fingers 70 are raised above the path of travel of the successive swabs A off the terminus of conveyor 12 and onto platform member 38. Thus, with body 65 at its rest position, fingers 70 do not interefere with the continuous delivery of swabs onto platform member 38. When body member 65 is displaced from its rest position along cam member 75, rollers 72 are pressed axially toward each other by the inside surfaces of rails 77 and ride off surface 82 onto the central depressed surface 80 of the cam member. The level of depressed surface 80 is selected so that the downward movement of pusher 69 resulting from the engagement of rollers 72 with surface 80 is sufficient to extend fingers 70 at least to the level of the top surface of platform member 38, whereby the fingers 70 engage the last of the swabs accumulated on the platform member and propel the accumulated swabs along platform member 38 toward conveyor 11. When body 65 reaches its fully displaced position adjacent the side of conveyor 11 closest to support member 38, rollers 72 engage the end surface portion 79 and thus are free to be displaced axially away from each other by spring 73. During the return of body 65 to its rest position, rollers 72 engaging the sides of recess 71 ride up ramps 78 and onto the top surfaces of rails 77, whereby pusher 69 is again elevated to lift its fingers 70 above the swabs which have been continuously accumulating on platform member 38 in back of fingers 70 during the movement of body 65 to its displaced position. When body 65 returns to its rest position, rollers 72 ride off rails 77 at the end portions 81 of the latter and again engage the elevated surface 82 of the cam.

In order to effect the movements of body 65 between its rest and displaced positions, such body is suitably connected to the end of a piston rod 83 extending from a compressed air or other fluid pressure operated cylinder 84 which is suitably mounted, as by a bracket 85 extending from track 68 (FIGS. 1 and 2). Thus, when compressed air is admitted to cylinder 84 in the direction to retract its piston rod 83, body 65 is moved to its rest position, and, when compressed air is admitted to cylinder 84 in the direction to extend its piston rod, body 65 is moved from its rest position to its fully displaced position.

Figure 7:
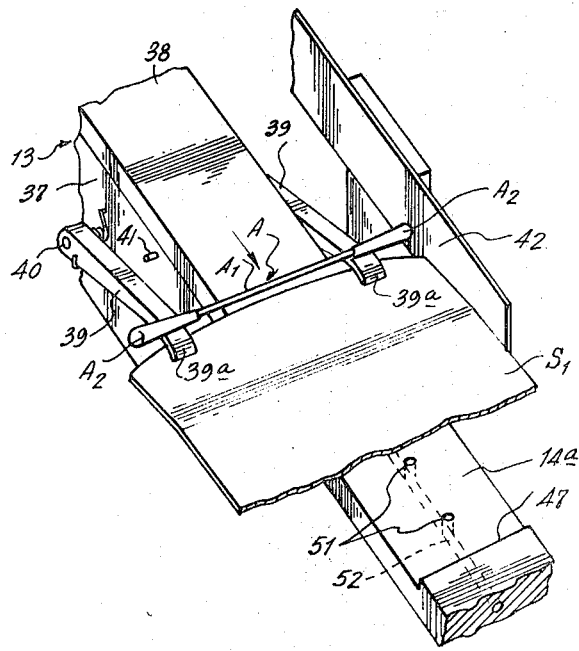
FIG. 7 is a fragmentary perspective view illustrating a stage in the operation of the apparatus.

As hereinafter described in detail, the operations of cylinders 64 and 84 are coordinated so that, upon the accumulation of a predetermined number of swabs A on platform member 38, support member 14 is rapidly moved to its extended position to dispose a separating sheet $S_1$ above the tray $T_1$ at loading station LS and, simultaneously with such movement of support member 14, but at a substantially slower speed, body 65 of pusher assembly 16 is moved from its rest position to its displaced position for propelling the accumulated swabs onto the sheet $S_1$. By reason of the relatively slow movement of body 65, sheet $S_1$ is disposed above tray $T_1$ when the propelled swabs begin arriving at the discharge end of platform member 38. It will be apparent that, when support member 14 is at its extended position, the upwardly curved end 44a of spring 44 engages the adjacent edge portion of sheet $S_1$ at the center of such edge to hold the latter down upon the support member. Further, as the successive accumulated swabs A are propelled along platform member 38 and held against upward movement by overhead guide 43, such swabs ride over the end portions of fingers 39 to deflect the latter downwardly, whereby the downwardly curved ends 39a of fingers 39 depress the adjacent edge portions of sheet $S_1$ at the opposite sides of support member 14. Such action of fingers 39 on edge portion of sheet $S_1$ ensures that such edge portions will not interfere with the movement onto the sheet of the swab tips $A_2$ which are of greater diameter than the stick $A_1$ therebetween (FIG. 7).

When body 65 of pusher assembly 16 has reached its fully displaced position, that is, when the predetermined number of accumulated swabs have been propelled in order onto separating sheet $S_1$, the swab depositing assembly 17 is operated to deposit such swabs and the underlying sheet $S_1$ downwardly into the tray $T_1$ therebelow as support member 14 is returned to its retracted position and, simultaneously, pusher assembly 16 is returned to its rest position. As shown particularly on FIGS. 2 and 3, the assembly 17 comprises a base 86 extending laterally from the top of track 68 over loading station LS. Guide rods 87 (FIG. 2) are vertically slidable in bushings 88 carried by base 86 and, at their lower ends, are secured to a cross head 89 having parallel plates 90 depending from its opposite sides so as to lie in vertical planes which are parallel to, and spaced outwardly from the longitudinal edges of guide 43. A central control rod 91 extends upwardly from cross-head 89 between guide rods 87 and passes loosely through an opening 92 in base 86. A helical compression spring 93 is arranged around rod 91 between base 86 and cross-head 89 so as to yieldably urge the latter in the downward direction. The upper end portion of rod 91 extends loosely through an opening 94 in an actuating member 95 (FIG. 3), and rod 91 has an enlarged head 96 at its upper end which is engageable from below by actuating member 95. Actuating member 95 is mounted for vertical movement, for example, by a slide 97 movable along a vertical track 98 which is secured on a standard 99 extending from base 86. A tension spring 100 extends between a bracket 101 at the upper end of standard 99 and actuating member 95 to urge the latter to a raised position, as shown in full lines on FIG. 3, where actuating member 95 engages head 96 of rod 91 to raise plates 90 to a rest position at which its lower edges are disposed substantially above swabs A being propelled onto sheet $S_1$, as previously described. A compressed air or other fluid pressure operated cylinder 102 is mounted on bracket 101 and has its piston rod 103 secured to actuating member 95 so that, when compressed air is admitted to cylinder 102 for extending the piston rod 103 therefrom, actuating member 95 is lowered away from head 96 of rod 91 thereby releasing plates 90 to be propelled downwardly both by gravity and by the spring 93. Thus, when compressed air is supplied to cylinder 102, the horizontal lower edges of plates 90 engage from above with the swabs A on sheet $S_1$ and, upon the return of support member 14 to its retracted position, plates 90 drive the swabs and the underlying separating sheet downwardly into tray $T_1$.

The operating stroke of cylinder 102 is selected so that, when its piston rod 103 is fully extended, actuating member 95 is thereby moved downwardly to a position, as indicated at 95′, at which the upper surface of actuating member 95 is spaced downwardly from head 96 even with the lower edges of plates 90 resting against the bottom of tray $T_1$. Thus, the downward travel of plates 90 is dependent upon the number of layers of swabs previously loaded into tray $T_1$. At all times, the downward travel of plates 90 is suitable to uniformly and compactly dispose each layer of swabs within the tray.

As hereinafter described in detail, the downward movement of actuating member 95 is initiated simultaneously with the return movement of support member 14 toward its retracted position. Thus, the bottom edges of plates 90 engage swabs A on separating sheet $S_1$ before the complete withdrawal of support member 14 from below the sheet. Such engagement of plates 90 with swabs A and the inherent stiffness of sheet $S_1$ ensure that the latter will not tilt and that the swabs will remain uniformly distributed thereon during withdrawal of support member 14 and during the downward deposit of the swabs and the underlying separating sheet in the tray therebelow.

When compressed air is exhausted from cylinder 102, spring 100 returns actuating member 95 to its raised position and, through the engagement of actuating member 95 with head 96, also lifts plates 90 to the raised position thereof shown in full lines on FIG. 3.

Referring now to FIG. 11, it will be seen that, in a pneumatic system for operating the apparatus 10, a compressed air supply line 104 is connected through branch lines 105, 106 and 107 to solenoid valves $SV_1$, $SV_2$ and $SV_3$ which respectively control the supplying of compressed air to cylinders 64 and 68, to cylinder 102 and to cylinder 29. Solenoid valve $SV_1$ is connected through a line 108 and branches 108a and 108b extending therefrom to the ends of cylinders 64 and 84, respectively, from which piston rods 63 and 83 extend, and through a line 109 and branches 109a and 109b extending therefrom to the opposite ends of cylinders 64 and 84, respectively. Further, solenoid valve $SV_1$ has two oppositely acting solenoids $SV_{1a}$ and $SV_{1b}$ which are alternately energizable to dispose the solenoid valve in first and second positions. When solenoid $SV_{1a}$ is energized, line 109 is connected to the compressed air supply branch line 105 and line 108 is exhausted to the atmosphere so that compressed air acts simultaneously in cylinders 64 and 84 in the directions to extend their piston rods 63 and 83 therefrom, whereby to move support member 14 from its retracted position to its extended position and to move pusher assembly 16 from its rest position to its displaced position. Conversely, when solenoid $SV_{1b}$ is energized, line 108 is connected to the compressed air supply branch line 105 and line 109 is exhausted to the atmosphere so that compressed air acts in cylinders 64 and 84 in the directions to retract the respective piston rods and thereby return support member 14 to its retracted position and pusher assembly 16 to its rest position. In order to provide for the relatively slow movement of pusher assembly 16 from its rest position to its displaced position so that support member 14 will be in its extended position to receive on the separating sheet carried thereby the accumulated swabs propelled by the pusher assembly 16, branch line 109b has a metering orifice or restriction 110 interposed therein for reducing the rate of flow of compressed air through the branch line 109b to cylinder 84.

Solenoid valve $SV_2$ is connected through a single line 111 to the upper end of cylinder 102 and is arranged so that, when its solenoid is energized, line 111 is connected with branch line 106 to supply compressed air to cylinder 102 for extending its piston rod 103 and thereby effecting downward movement of actuating member 95 in assembly 17. Conversely, when the solenoid of valve $SV_2$ is de-energized, line 111 is exhausted to atmosphere to permit spring 100 to return actuating member 95 to its raised position.

Solenoid valve $SV_3$ is similar to the previously described solenoid valve $SV_1$ and is connected through lines 112 and 113 to the opposite end portions of cylinder 29. Thus, when the solenoid $SV_{3a}$ of valve $SV_3$ is energized, line 112 is connected to compressed air supply branch line 107 and line 113 is exhausted to the atmosphere so that compressed air acts within cylinder 29 in the direction to extend its piston rod 28 and thereby effect an advance of conveyor 11 for moving a loaded or filled tray from loading station LS and for positioning an empty tray at such loading station. Conversely, when solenoid $SV_{3b}$ is energized, line 113 is connected to compressed air supply branch line 107 and line 112 is exhausted to the atmosphere so that compressed air acts in cylinder 29 to retract its piston rod 28 and thereby dispose the drive of conveyor 11 in the position for the next advancement of such conveyor.

Referring now to FIG. 12, it will be seen that electrical control circuits for controlling the operations of the pneumatic system described above with reference to FIG. 11 comprise a switch $Sw_1$ having contacts $a$ and $b$ and which is spring urged to normally close its contact $a$. Switch $Sw_1$ is suitably mounted, as shown on FIG. 11, so as to be engageable by actuating member 95 in the raised position of the latter for opening its contact $a$ and closing its contact $b$. The contact $b$ of switch $Sw_1$ is interposed in series with the coil of a relay $R_1$ in a circuit 114 extending between electric supply lines $L_1$ and $L_2$. Thus, circuit 114 is completed to energize relay $R_1$ only when actuating member 95 is in its raised position to lift plates 90 of assembly 17 well above the planes of support member 14 and platform member 38. Relay $R_1$ has its normally open contacts interposed in a circuit 115 connected between lines $L_1$ and $L_2$ and including a counter CtrI and the solenoid $SV_{1a}$. The counter CtrI may be of a conventional electronic or electromechanical type to receive pulses through a circuit 116 having a photocell 117 therein. As shown on FIG. 1, photocell 117 is mounted above the terminus of swab conveyor 12 to detect the delivery of the swabs from such conveyor onto platform member 38. As each swab moves off conveyor 12 onto platform member 38, the detection of the swab by photocell 117 causes a pulse to be sent through circuit 116 to counter CtrI. The counter CtrI is operative, upon receiving a predetermined number of pulses, that is, upon the accumulation of that number of swabs on platform member 38, to complete circuit 115 for energizing solenoid $SV_{1a}$ so long as relay $R_1$ is simultaneously energized to close its contacts, that is, so long as plates 90 of assembly 17 are in their elevated positions. As previously described, energizing of solenoid $SV_{1a}$ causes piston rods 63 and 83 to be extended, whereby to move support member 14 to its extended position and to move pusher assembly 16 from its rest position to its displaced position for propelling the accumulated swabs onto the separating sheet carried by support member 14 over the tray at the loading station.

When the body 65 of pusher assembly 16 reaches its displaced position, that is, when all of the accumulated swabs have been propelled onto the separating sheet, a cam member 118 mounted on body 65 engages a switch $Sw_2$ which is suitably mounted, as by a bracket 119 on track 68 (FIG. 2), so as to close the normally open contacts of switch $Sw_2$. As shown on FIG. 12, switch $Sw_2$ is connected in series with solenoid $SV_{1b}$ in a circuit 120 between lines $L_1$ and $L_2$. Thus, when body 65 of pushed assembly 16 reaches its fully displaced position, the contacts of switch $Sw_2$ are closed to energize solenoid $SV_{1b}$ for effecting the retraction of piston rods 63 and 83 and thus causing the return of support member 14 to its retracted position and of pusher assembly 16 to its rest position, as previously described. The closing of switch $Sw_2$ further completes a circuit 121 extending from the junction 122 in circuit 120 and containing the coil of a relay $R_2$ having its normally open contacts interposed in a circuit 123 in series with the solenoid of valve $SV_2$. Thus, as soon as switch $Sw_2$ is closed, relay $R_2$ is energized to close its contacts and thereby energize solenoid valve $SV_2$ for effecting the extension of piston rod 103 and hence the downward movement of actuating member 95. As previously described, such downward displacement of actuating member 95 releases the plates 90 for downward movement into engagement with the swabs on the separating sheet $S_1$. As soon as actuating member 95 commences its downward movement, it releases switch $Sw_1$ to open the contact $b$ and close the contact $a$ thereof. Extending from contact $a$ of switch $Sw_1$ to junction 122 is a circuit 124 having interposed therein a normally closed switch $Sw_3$. The switch $Sw_3$ is suitably mounted on base 46 (FIG. 1) so as to be engageable by a cam 125 carried by support member 14 when the latter is returned to its fully retracted position (FIG. 11). Engagement of cam 125 with switch $Sw_3$ opens the latter and thereby interrupts circuit 124.

It will be apparent from FIG. 12 that, after closing of switch $Sw_2$ initiates the energizing of solenoid $SV_{1b}$ and of relay $R_2$ to energize solenoid $SV_2$, the closing of contact $a$ of switch $Sw_1$ in response to downward displacement of actuating member 95 results in the continued energization of solenoids $SV_{1b}$ and $SV_2$ through circuit 124 and circuits 120 and 121 extending from junction 122 until switch $Sw_3$ is opened in response to the return of support member 14 to its retracted position. When solenoid $SV_2$ is deenergized in response to the opening of switch $Sw_3$, spring 100 again becomes effective to return actuating member 95 to its raised position and hence to elevate plates 90 of assembly 17 well above the planes of platform member 38 and the retracted support member 14.

The control circuits, as shown, further comprise a second conventional electronic or electrochemical counter $CtrII$ which is set to determine the number of layers of swabs to be loaded into each tray at the loading station. In order to count the number of layers of swabs loaded into each tray, counter $CtrII$ is connected in a circuit 126 extending from junction 122 to receive a pulse upon each closing of switch $Sw_2$, that is, upon the propelling of an accumulated number of swabs from platform member 38 onto a separating sheet supported by member 14 above the tray. Upon the reception of a predetermined number of pulses corresponding to the number of layers of swabs to be loaded into each tray, counter $CtrII$ closes a circuit 127 that includes solenoid $SV_{3a}$ and extends from a junction 128 in circuit 115. Thus, counter $CtrII$ is effective to cause energizing of solenoid $SV_{3a}$, and hence to cause cylinder 29 to effect an advancement of conveyor 11, only after actuating member 95 has returned to its raised position to close contact $b$ of switch $Sw_1$, and therefore to elevate plates 90 out of the path of travel of the trays on conveyor 11.

Figure 10:
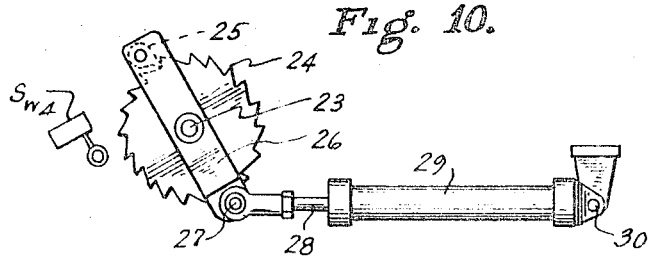
FIG. 10 is a side elevational view of the drive for the container conveyor of the apparatus, as viewed in the direction of the arrows 10—10 on FIG. 1.

Finally, the illustrated control circuits include a normally open switch $Sw_4$ interposed in series with solenoid $SV_{3b}$ in a circuit 129 extending between lines $L_1$ and $L_2$. As shown particularly on FIG. 10, switch $Sw_4$ is suitably mounted so as to be engageable by arm 26 of the drive for conveyor 11 at the conclusion of a working stroke of cylinder 29. Such engagement of switch $Sw_4$ by arm 26 closes the switch and thereby energizes solenoid $SV_{3b}$ so as to supply compressed air to cylinder 29 in the direction for retracting its piston rod 28. Upon such retraction of piston rod 28, the various controls of the apparatus 10 are restored to their original positions for the repeating of the cycle of operations thereof, as described above.

It will be apparent that the described apparatus 10 is capable of the fully automatic loading of any predetermined number of layers of swabs in the intermittently conveyed trays T with separating sheets being interposed between the successive layers. Such apparatus is capable of receiving the swabs continuously from the conveyor 12, and further is capable of high speed operation so as to receive the swabs at a rate commensurate with the rate of production of modern swab producing machines.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for packaging elongated particles in upwardly opening containers, comprising first conveyors means for intermittently transporting successive containers to and from a position of rest at a loading station, an article receiving platform extending to said loading station at one side of the path of movement of the containers on said first conveyor means and at a level above the adjacent side of a container at said station, second conveyor means transporting successive articles to a terminus at said platform for accumulation of articles thereon with the articles extending side-by-side generally parallel to said path of movement of the containers at said loading station, a support member reciprocable substantially in the plane of said platform in a working stroke from a retracted position at the other side of said path of movement to an extended position where said support member substantially abuts said platform to overlie a container at rest at said loading station and in a return stroke back to said retracted position pusher means reciprocable over said platform in a working stroke from a rest position adjacent said terminus to a displaced position adjacent said one side of the path of movement for displacing accumulated articles from said platform onto said support member in said extended position thereof and in a return stroke back to said rest position, means operative upon the accumulation of a predetermined number of articles on said platform to effect said working strokes of said support member and pusher means at relatively high and low speeds, respectively, so that said support member is at said extended position to receive the articles upon displacement of the latter from said platform by said pusher means, and means operative upon the completion of said working stroke of the pusher means to effect said return strokes of said support member and pusher means and thereby permit the articles to fall from said support member into a container at said loading station.

2. Apparatus according to claim 1, in which said means operative to effect said working strokes of the support member and pusher means includes first and second fluid pressure operated actuating means connected with said support member and said pusher means, respectively, a source of fluid under pressure, conduit means for supplying fluid under pressure from said source to said first actuating means and to said second actuating means in directions to effect said working strokes, and metering means interposed in said conduit means to said second actuating means to restrict the rate of fluid flow thereto and thereby achieve said relatively low speed of said working stroke of the pusher means.

3. Apparatus according to claim 1, in which said pusher means includes pusher fingers movable between elevated and lowered positions with respect to said platform to respectively clear and engage articles on the platform, and cam controlled means holding said fingers in said elevated position when at said rest position to permit the discharge of articles at said terminus onto said platform, permitting the movement of said fingers to said lowered position during said working stroke of the pusher means and raising said fingers to said elevated position during said return stroke so that articles can be accumulated on said platform in back of said pusher fingers during said working stroke and the thus accumulated articles are unaffected by said pusher fingers during said return stroke.

4. Apparatus according to claim 1, further comprising means to drive said first conveyor means after a plurality of said working strokes of said support member and said pusher means so that each container brought to rest at said loading station receives a plurality of superposed layers of said articles with each layer having said predetermined number of said articles therein.

5. Apparatus according to claim 4, further comprising means to deposit a separator on said support member at said retracted position for transport by said support member to said extended position so that the articles displaced from said platform are received by a separator on said support member, and means to strip the separator from said support member during said return stroke of the latter so that the suporposed layers of articles have separators therebetween.

6. Apparatus according to claim 5, in which said means to deposit a separator on said support member includes a magazine for a vertical stack of separators, said support member being disposed at the bottom of said magazine to receive the lowermost separator card in said stack when in said retracted position and to slide the received card from under said stack during said working stroke.

7. Apparatus according to claim 6, in which said support member has bore means therein opening at its upper surface, and means is provided connecting said bore means to a source of vacuum so that each separator card is adhered by suction to said support member during said working stroke of the latter.

8. Apparatus according to claim 5, further comprising means adjacent said platform to depress the adjacent side portion of each separator carried by said support member to said extended position for ensuring that the articles displaced from said platform are received on top of the separator.

9. Apparatus according to claim 8, in which said articles are in the form of swabs constituted by slender sticks with relatively thick cotton tips at the ends thereof, said swabs have lengths greater than the later dimension of said platform and support member to project beyond the sides of the latter and said separators have dimensions in the longitudinal direction of the swabs at least as large as said lengths of the latter, and in which said means to depress the adjacent side portion of each separator includes depressing fingers pivotally mounted at the opposite sides of said platform and being yieldably urged upwardly to positions where end portions of said depressing fingers project above the surface of said platform and overlie said side portion of a separator carried by said support member in said extended position of the latter, whereby swabs displaced from said platform deflect said depressing fingers downwardly to act on the separator at the ends of said side portion for ensuring the free movement of said tips of the swabs onto said separator.

10. Apparatus according to claim 9, in which said means to depress the adjacent side portion of each separator includes means bearing downwardly on said side portion at the center of the latter.

11. Apparatus according to claim 5, further comprising means to act downwardly on the articles on each separator during said return strokes of the support member and pusher means so as to urge such articles into the underlying container as a uniform layer therein.

12. Apparatus according to claim 11, in which said means to act downwardly on the articles includes a vertically movable depositing member having a horizontal lower surface engageable from above with all of the articles disposed on a separator carried by said support member, means to hold said depositing member in a raised position above the plane of said platform member and said support member during said working strokes of said pusher means and support member, and means to release said depositing member for a downward movement into a container at said loading station upon the completion of said working stroke of the pusher means.

13. Apparatus according to claim 12, in which means are provided to prevent said working strokes of the pusher means and support member and the driving of said first conveyor means whenever said depositing member is displaced from said raised position.

References Cited
UNITED STATES PATENTS 2,767,534 10/1956 Nydegger et al. ____ '53—244 XR
3,074,212 1/1963 Castner _____ 53—236 XR THERON E. CONDON, Primary Examiner R. L. SPRUILL, Assistant Examiner U.S. Cl. X.R.

53—142, 157, 164, 236, 244, 250